(No Model.)
H. H. BEACH.
PROCESS OF REMOVING TANNIC ACID FROM COFFEE.
No. 300,436. Patented June 17, 1884.
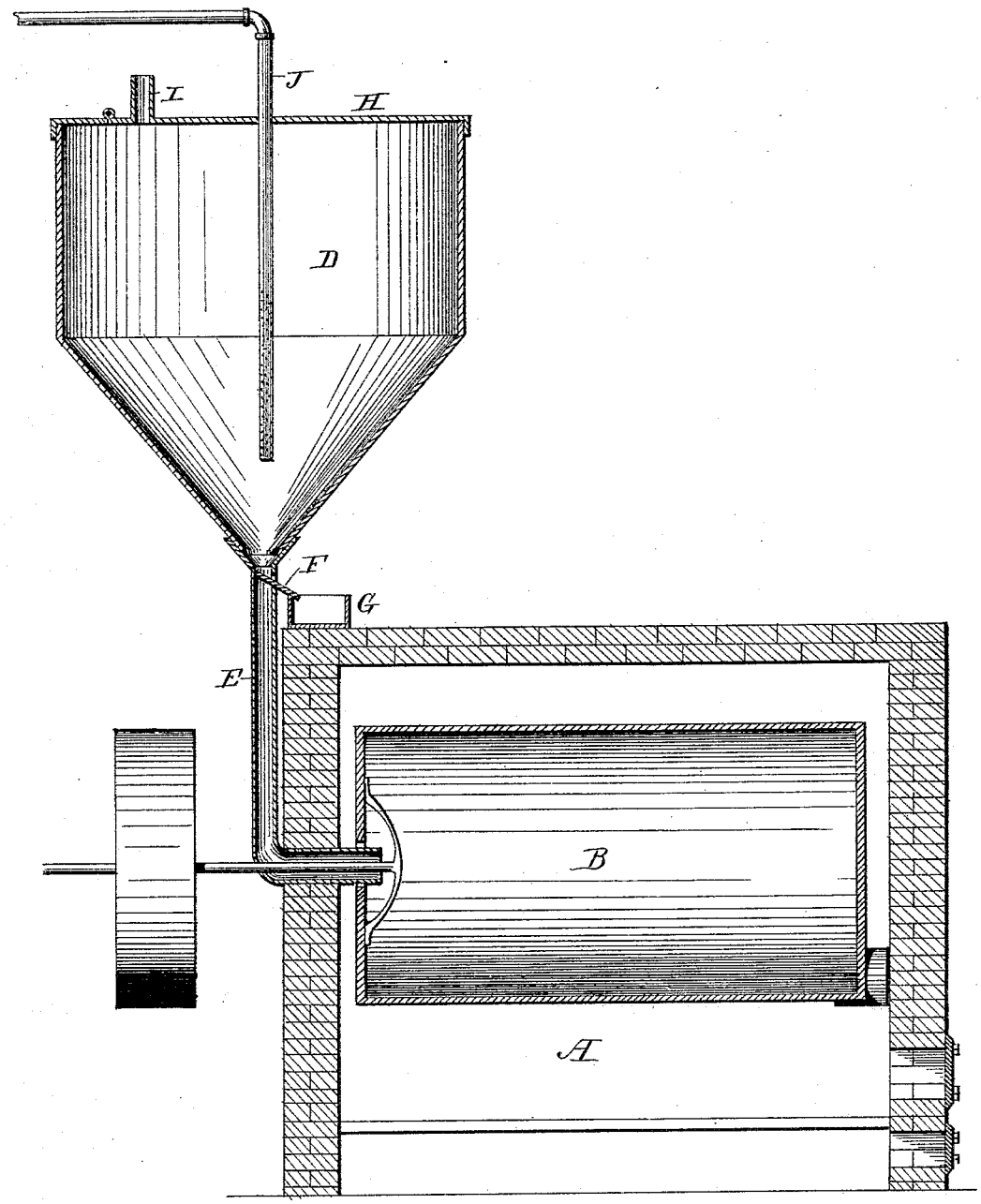
WITNESSES
F. S. Ourand.
E. G. Siggers.
INVENTOR
Henry H. Beach
by C. A. Snow & Co.
Attorneys

UNITED STATES PATENT OFFICE.

HENRY H. BEACH, OF ROME, NEW YORK.

PROCESS OF REMOVING TANNIC ACID FROM COFFEE.

SPECIFICATION forming part of Letters Patent No. 300,436, dated June 17, 1884.

Application filed July 13, 1883. (No model.)

*To all whom it may concern:*

Be it known that I, HENRY H. BEACH, of Rome, Oneida county, New York State, have invented a certain new and useful Process of Treating Coffee for the Removal therefrom of Tannic Acid and other Deleterious Substances, such as Must, of which the following is a specification.

It is my object to extract and remove tannic acid and other deleterious substances—such as must—from green coffee with a view to improving it for subsequent use. I have discovered that in order to obtain this result the green coffee must be raised to the very considerable heat of 212° Fahrenheit, or thereabout. A materially less degree of heat is insufficient for the purpose, and a materially greater degree of heat is inadmissible, for the reason that it injures the quality of the berry and impairs its flavor. Indeed the berry I find can be maintained at 212° only for a comparatively short time. To maintain the berry at this heat for much longer than forty-five minutes will injure it. I have, for instance, found in practice that if the heat be continued for, say, an hour and a half or two hours, the coffee will lose so much in quality and flavor as to be of little or no value. On the other hand, if the time be reduced much below forty-five minutes, the full benefit of the process will not be reached. In order to furnish the heat to the coffee, I make use of steam, which I discharge into and disseminate through the mass, leaving free escape for the vapor. By this means the mass is soon brought to 212° Fahrenheit, while the steam takes up and carries off from the berries the acid, must, &c., brought to the surface by its action. In this way I extract from the coffee a considerable percentage of tannic acid and other deleterious matters contained therein without injuring its flavor.

In the accompanying drawing, the single figure represents a longitudinal vertical section of a coffee-roasting apparatus, to which my invention has been applied.

A designates a furnace, and B a roasting-cylinder. In the construction and arrangement of these parts no novelty is herein claimed, and they may be omitted.

D is a hopper arranged and adapted to be connected with the roasting-cylinder by the discharge-pipe E, so that the contents of the hopper may be discharged into the cylinder through the said pipe. The hopper D has an inclined bottom slide, F, for the purpose of conveying the water from the condensed steam to a suitable receptacle, G. The hopper D is provided with a cover, H, through which passes a pipe, I, for the purpose of discharging the steam after it has passed through the coffee contained therein. The pipe J is connected with a steam-generator, and extends vertically into the hopper D, as shown, and is open at its lower end. This arrangement may be variously modified to produce a like result.

In operation, the coffee to be treated is turned into the hopper D, the cover placed upon the latter, and steam admitted through the pipe J, so as to cause the coffee to become heated to about 212° Fahrenheit. I recommend to continue this process of steaming for from thirty to forty-five minutes, (but this period may be varied,) when the supply of steam should be shut off and the inclined bottom withdrawn, thus causing the coffee to pass into the roasting-cylinder, where the roasting process is proceeded with in the usual manner.

I have described and shown an arrangement by which the coffee after treatment by my process may be immediately roasted; but the process may be conducted independently of a roaster, and the coffee subsequently dried and stored for future use, in which case the high heat of the coffee will assist in its subsequent drying.

My experience has shown that by careful treatment by this process a considerable amount of tannic acid and other deleterious substances—such as must—are removed therefrom, and the coffee much improved in quality.

I am aware that green coffee has been artificially sweated by subjecting it for from one to four days to the action of heat in a closed vessel or compartment, to which steam is admitted in quantity sufficient to supply the desired moisture to produce sweating. This is not my invention.

What I claim as new and of my invention is—

The process of treating coffee for the removal of tannic acid and other deleterious substances therefrom, which consists in heating the green coffee by means of steam to about 212° Fahrenheit for about the time specified, and removing the matter extracted from the berry, substantially as hereinbefore set forth.

In testimony that I claim the foregoing as my own I have hereto affixed my signature in presence of two witnesses.

HENRY H. BEACH.

Witnesses:
C. A. NEALE,
EDWARD G. SIGGERS.